United States Patent
Paulus

(10) Patent No.: US 9,058,387 B2
(45) Date of Patent: Jun. 16, 2015

(54) METHOD AND SYSTEM FOR CONDUCTING ADVERSARIAL DISCUSSIONS OVER A COMPUTER NETWORK

(76) Inventor: Jack R. Paulus, Oakland, CA (US)

( * ) Notice: Subject to any disclaimer, the term of this patent is extended or adjusted under 35 U.S.C. 154(b) by 989 days.

(21) Appl. No.: 11/113,808

(22) Filed: Apr. 25, 2005

(65) Prior Publication Data

US 2006/0242185 A1    Oct. 26, 2006

(51) Int. Cl.
| | |
|---|---|
| G06F 15/16 | (2006.01) |
| G06F 17/30 | (2006.01) |
| H04L 29/08 | (2006.01) |
| H04L 29/06 | (2006.01) |
| G06Q 10/10 | (2012.01) |

(52) U.S. Cl.
CPC .... *G06F 17/30861* (2013.01); *H04L 29/08072* (2013.01); *H04L 29/06* (2013.01); *G06Q 10/10* (2013.01)

(58) Field of Classification Search
USPC .......................................................... 709/204
See application file for complete search history.

(56) References Cited

U.S. PATENT DOCUMENTS

| | | | | |
|---|---|---|---|---|
| 2001/0018698 | A1* | 8/2001 | Uchino et al. ................ | 707/533 |
| 2001/0028364 | A1* | 10/2001 | Fredell et al. ................ | 345/751 |
| 2005/0131916 | A1* | 6/2005 | Banatwala et al. ........... | 707/100 |
| 2005/0198128 | A1* | 9/2005 | Anderson et al. ............ | 709/204 |
| 2005/0228983 | A1* | 10/2005 | Starbuck et al. ............. | 713/151 |
| 2006/0004601 | A1* | 1/2006 | Marks .............................. | 705/1 |
| 2006/0026593 | A1* | 2/2006 | Canning et al. .............. | 718/100 |
| 2006/0195536 | A1* | 8/2006 | Tsuboi et al. ................ | 709/206 |

OTHER PUBLICATIONS

Carr, Chad S, The Effect of Computer-Supported Collaborative Argumentation (CSCA) on Argumentation Skills in Second-Year Law Students, 1999, p. 9 line 10 to p. 13 line 4.*
Schuler, Wolfgang, Author's Argumentation Assistant (AAA): a hypertaxt-based authoringtool for argumentative texts, 1992, Cambridge University Press New York, NY, U.S.A.*

* cited by examiner

*Primary Examiner* — Chris Parry
*Assistant Examiner* — Alan S Chou

(57) ABSTRACT

The patent describes and claims methods and systems for hosting and administering a forum for adversarial discussion. The invention consists of the underlying concepts, rules, and features of a distributed software program for conducting online debates. These concepts, rules, and features create a forum and an online tool for enforcing focused, rational debate. Rules are enforced that prevent digression, noise over content, and non-substantive, unproductive participation. In one embodiment, the method of hosting a debate includes the step of accepting a first statement from a topic author. By submitting the first statement, the topic author is creating a topic structure, which represents the basis for a debate on a particular topic. The topic author adds statements to the topic structure that can support the first statement and can proceed to build the topic structure which is comprised of debate structures containing specific statements and related data, such as critiques, rebuttals, a revision history, and scores. Other debate participants can react to the statements in a topic structure by submitting critiques of statements and can rank statements and rebuttals. A topic structure is manifested by at least two visual components: a statement map and a topic layout. These features of the present invention provide a context for the debate, whereby the ability to revise statements, critiques and rebuttals prevents digression allows for a rational debate in a controlled forum.

15 Claims, 4 Drawing Sheets

METHOD AND SYSTEM FOR CONDUCTING ADVERSARIAL DISCUSSIONS OVER A COMPUTER NETWORK

BACKGROUND OF THE INVENTION

1. Field of the Invention

The present invention relates to software for implementing structures and methods of conducting debates and adversarial discussion among participants over a computer network. Specifically, it relates to software for enabling an efficient structure for online communication that promotes focused, time-saving, and rational discussions.

2. Discussion of Related Art

Although the number of present Internet and computer network applications and forums for conducting debates and adversarial discussions via electronic communication over a computer network is vast they have significant drawbacks.

Despite the vast increase in online communication and the growing prevalence of online debates and adversarial discussions, the quality of such discussions and debate has not improved. Free-form discussion methods such as e-mail, instant messaging, discussion-groups, and "chat rooms," as well as live conversation or verbal argumentation, all suffer from weaknesses that make it difficult to foster rational and structured debate among participants because of their free form nature.

Online discussions began with Usenet Newsgroups, CompuServe Forums, and early e-mail which catered to a small minority of technical users. Over the past decade, these tools have grown and presently have millions of users who regularly discuss a wide range of topics, while e-mail, also used to discuss and debate issues, has become the single most widespread tool on the Internet. However, both modes of communication lack structure, have low content-to-noise ratios, and suffer from other drawbacks.

With online discussions, a typical discussion begins when one individual makes one or a series of points or statements which initiates a dialogue. Individuals responding to these points do so in any manner they wish. As a result current methods start with an argument which stems outwards in many directions. This outward meandering approach to responding to a point frequently results in the original point and its context getting lost while individuals pursue fragments of the original issue. It is only with considerable effort that both participants and observers can be mindful of all of the responses and points made and how they relate to the main argument. Given that online discussions can take place over significant periods of time, the cognitive overload required of the participants and observers (hereinafter "users") often results in off-topic discussions because users fail to recall the original context.

Another problem arises from the fact that users often conflate an assumption—a belief that one accepts as true without support—and inferences and conclusions that they make from that assumption. This often inadvertent mixing of two different types of beliefs suggests implied support for an assumption that does not exist. Including hidden assumptions often dilutes a rigorous and disciplined debate or any type of rational dialogue and all assumptions should be distinguished from inferences, conclusions, and so on.

Another issue with traditional, free-form methods such as e-mail and discussion groups is that although communication within an adversarial discussion or debate often consists of two distinct phases, this distinction is lost or blurred with e-mail and discussion groups. The first phase consists of the back-and-forth between users where each is simply trying to understand what the others are trying to say or what their point is. The second phase is the distillation of what the true disagreement is—the "Aha!" moment—when two or more users realize what their differences really are. While the 'back-and-forth' phase is essential to reaching the "Aha!" moment, it is only the true disagreement that is fundamental to the adversarial discussion or debate. With present communication tools, forums, and applications there is no distinction between these two phases. The true point of disagreement is buried amid excessive noise leading to a high noise-to-content ratio.

Because of the unstructured, free-form characteristic of present tools for adversarial discussion, a frequent problem is digression, both intentional and unintentional, from the main point. Unintentional digression is expected within a context-free method given that a free-form structure allows users to unintentionally digress. In contrast, intentional digression often occurs in response to valid criticism of a position and is typically an attempt to distract other users from evaluating such criticism and to bury it amid other less insightful or relevant statements. Both forms of digression increase the cognitive load of users attempting to ascertain the relevant parts of a debate and are fundamentally detrimental to understanding, participating, and benefiting from an adversarial discussion of a topic.

Another drawback of present tools and forums stems from human nature's predisposition to try and 'get the last word' in a debate or discussion. As the phrase implies, 'getting the last word' means that a user or speaker is the last one to be heard in an argument. Present tools encourage this behavior which is a strong motivating factor to continue an argument beyond the point where the discussion is meaningful and worthwhile, exacerbating all the drawbacks described above. Furthermore, present tools by their very nature give a user with the highest number of statements or posts to a discussion a distinct advantage, allowing essentially a filibuster of a critique.

It is worth noting that the related field of Collaborative Argumentation generally assumes a cooperation of participants seeking a common goal and is not intended to foster adversarial discussion. Collaborative Argumentation methods result in enormous tree structures with the disadvantages described above. When a discussion is adversarial instead of cooperative then these tree structures become even more unwieldy due to the increased back-and-forth discussion among users who do not agree. This increases the cognitive loads on users as they try to keep the most relevant information in mind while attempting to block out the noise.

Thus, there is a need for an application and tool for conducting, facilitating and fostering rational and focused adversarial discussions.

SUMMARY OF THE INVENTION

Additional features and advantages of the invention will be set forth in the description which follows, and in part will be obvious from the description, or may be learned by practice of the invention. The features and advantages of the invention may be realized and obtained by means of the methods and configurations particularly pointed out in the appended claims. These and other features of the present invention will become more fully apparent from the following description and appended claims, or may be learned by the practice of the invention as set forth herein.

Method and systems for hosting and administering a forum for adversarial discussion over a computer network are described. In one aspect of the invention, a method of hosting an adversarial discussion, such as a debate, includes the step of accepting a first statement from a topic author. By submitting the first statement which can be an assumption or a conclusion, the topic author is creating a topic structure, which represents the basis for a discussion on a particular topic. The topic author adds statements to the topic structure that can support the first statement and can proceed to build the topic structure which is comprised of debate structures containing specific statements and related data, such as critiques, rebuttals, a revision history, and scores. Other discussion participants can react to the statements in a topic structure by submitting critiques of statements and can score statements, rebuttals, and other critiques that they did not author. A ranking results through the accumulation of scores or votes from many users. Statements, critiques, rebuttals, and other facets of a topic structure can be changed using various functional modules of the online debate application software of the present invention. A topic structure is manifested to the topic author and participants by at least two visual components: a statement map and a topic layout. In sum, the invention is the combination of a deductive structure and the ability to revise statements, critiques and rebuttals, referred to as revisioning. The deductive structure is comprised of one or more assumptions and conclusions. The revisioning aspect of the invention is comprised of critiques, rebuttals, a history of critiques and rebuttals, and modifications to the topic statements themselves. This aspect prevents digression and keeps the argument focused on the deductive structure. It creates a context that fosters users to look inward at the point of the argument and prevents the outward flow of the deductive structure. The structure is the context in which users may only revise critiques which affords an inward focus at the argument and prevents the outward flow of information.

BRIEF DESCRIPTION OF THE DRAWINGS

In order to describe the manner in which the invention can be implemented, a more particular description of the invention briefly described above is provided by reference to specific embodiments illustrated in the appended drawings. Understanding that these drawings depict only typical embodiments of the invention and therefore are not to be considered limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other methods, structures, and configurations may be used without parting from the spirit and scope of the invention.

Figure 1:
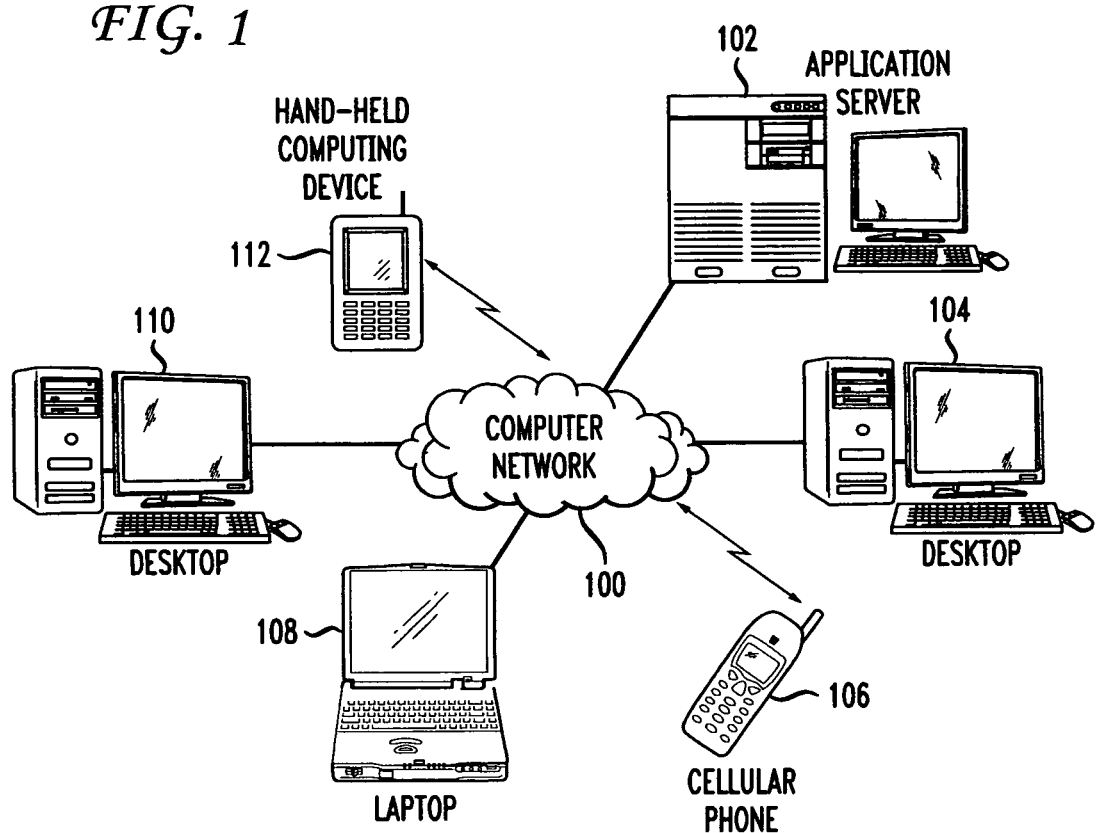
FIG. 1. is a diagram showing a configuration of hardware components for enabling an online debate application tool and forum of the present invention.

FIG. 1 is a diagram of a configuration of hardware components for enabling an online debate application tool and forum of the present invention. A computer network 100, for example, the Internet, a VPN, an Ethernet network, and so on, connects an application server 102 to a plurality of various client computing devices. If computer network 100 is the Internet, there is also a Web server (not shown). Examples of client computer devices shown in FIG. 1 include desktop computers 104 and 110, laptop computer 108, a computer network-enabled cell phone 106, and a computer network-enabled hand-held device 112.

In a preferred embodiment, computer network 100 is the Internet and the devices are generally client desktop and laptop computers. However, other types of Internet-enabled devices can be utilized for executing the online debate application tool of the present invention. Private networks, such as those used in classrooms, private entities, government organizations, and home/residential networks, can also be used as a data transmission means for implementing the online debate application tool of the present invention.

Application server 102 contains online debate application software which implements the online debate/adversarial discussion tool of the present invention. In a preferred embodiment, no software or applications are downloaded to client computing devices. In another preferred embodiment, software can be downloaded onto the client devices for enhanced functionality of the online debate application software.

Figure 2:
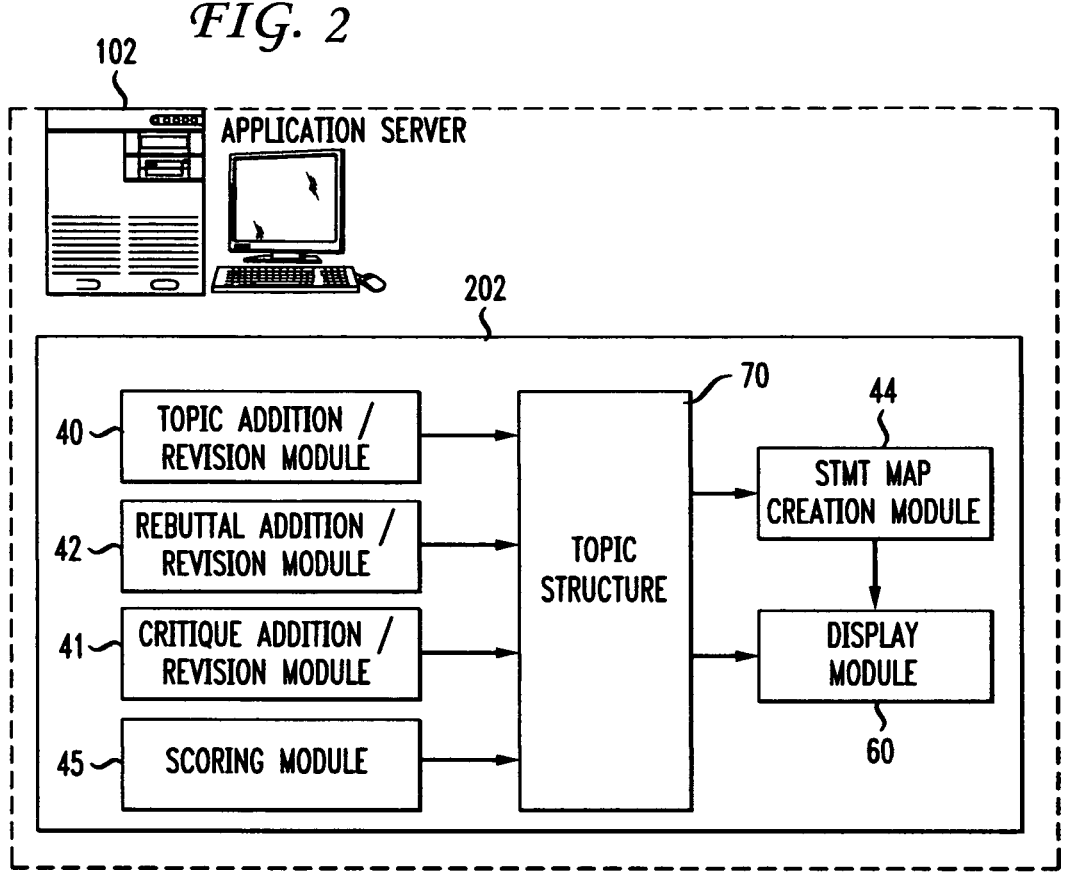
FIG. 2 is a block diagram of some of the functional components of debate application software in accordance with one embodiment of the present invention.

FIG. 2 is a block diagram of some of the functional components of debate application software 202 in accordance with one embodiment of the present invention. In a preferred embodiment, application software 202 resides and executes on application server 102 and the various client devices. Application software 202 contains the following components: topic addition/revision module 40, rebuttal addition/revision module 42, critique addition/revision module 41, scoring module 45, topic structure 70, statement map creation module 44, and display module 60. The process generally begins with a user making a point and then expecting to defend it. The user makes a single statement or point, which can be an ASSUMPTION or an eventual CONCLUSION, that she wishes to defend thereby creating a topic structure 70. No other users of the online debate application will see the topic until the topic author decides to publish topic structure 70.

Figure 3:
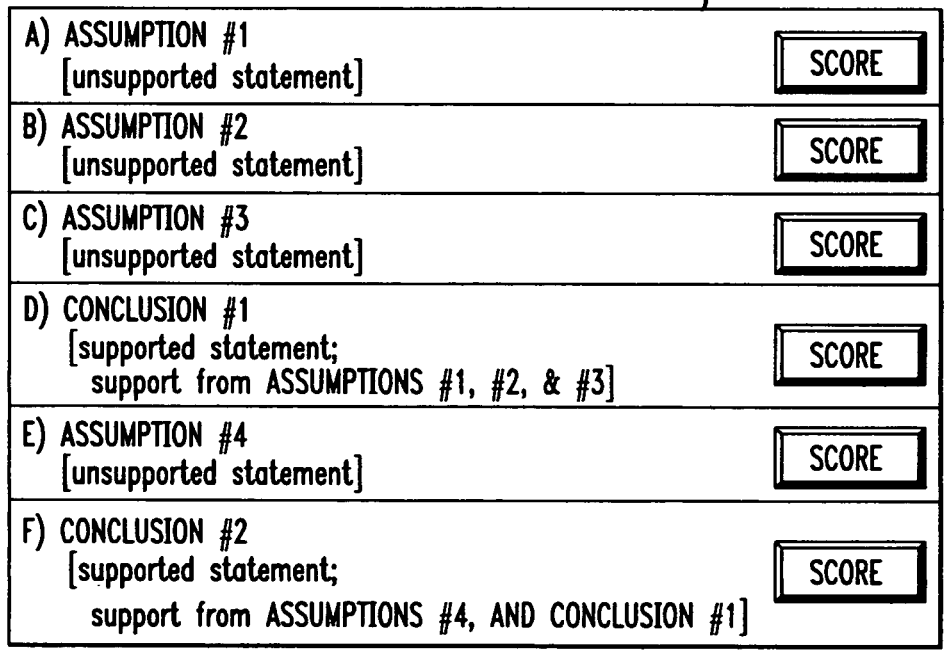
FIG. 3 is a diagram of statements that can be made in a debate and how they are presented to a user as a topic layout in accordance with one embodiment of the present invention.

FIG. 3 is a diagram of statements that can be made in a debate and how they are presented to a user as a topic layout in accordance with one embodiment of the present invention. Shown are a series of ASSUMPTIONS #1, #2, #3, and #4, and a series of CONCLUSIONS #1 and #2. The process starts with a user making a statement, e.g., "The death penalty is unconstitutional." This statement is automatically labeled as an ASSUMPTION, e.g., "ASSUMPTION #1", because by default it has no supporting statements. By making this statement, the user is starting to create a topic structure 70 which will be displayed as topic layout 91 shown in FIG. 3. The same user, the "topic author," can make any number of statements for topic structure 70. If the topic author wants to support ASSUMPTION #1, she can make supporting statements, e.g., "the death penalty amounts to cruel and unusual punishment" and "the vast majority of countries in the world consider the death penalty to be inhumane," thereby establishing a supporting relationship between these statements and the first that changes the first statement from an ASSUMPTION to a CONCLUSION. An ASSUMPTION statement is converted to a CONCLUSION statement when it has another statement (either ASSUMPTION or CONCLUSION) supporting it. For example, CONCLUSION #2 in FIG. 3 is a statement that is supported by an ASSUMPTION and a CONCLUSION.

The order in which statements are made by the topic author and the sequence of subsequent associations between them are irrelevant. A second statement is labeled an ASSUMPTION until the user adds a statement to support it at which time it becomes a CONCLUSION. This process continues for all statements until the topic author is confident that 1) each statement labeled as an ASSUMPTION, i.e., one that has no supporting statements, is truly something she is assuming and believes will be accepted as a fact or will not be contended, and 2) that each CONCLUSION, i.e., a statement that is supported by another statement, has all of the supporting statements she wants to provide. Of all the CONCLUSIONS made by the topic author, one or more will be considered the "point" of the discussion that the topic author wants to debate. Generally, the point will be the final CONCLUSION, that is, a CONCLUSION that is not supporting another statement. It is possible that an ASSUMPTION may be considered a point but it would very likely be considered by users to be a weak or trivial point and the topic author proceeds on this premise at her own adversarial peril.

Figure 4:
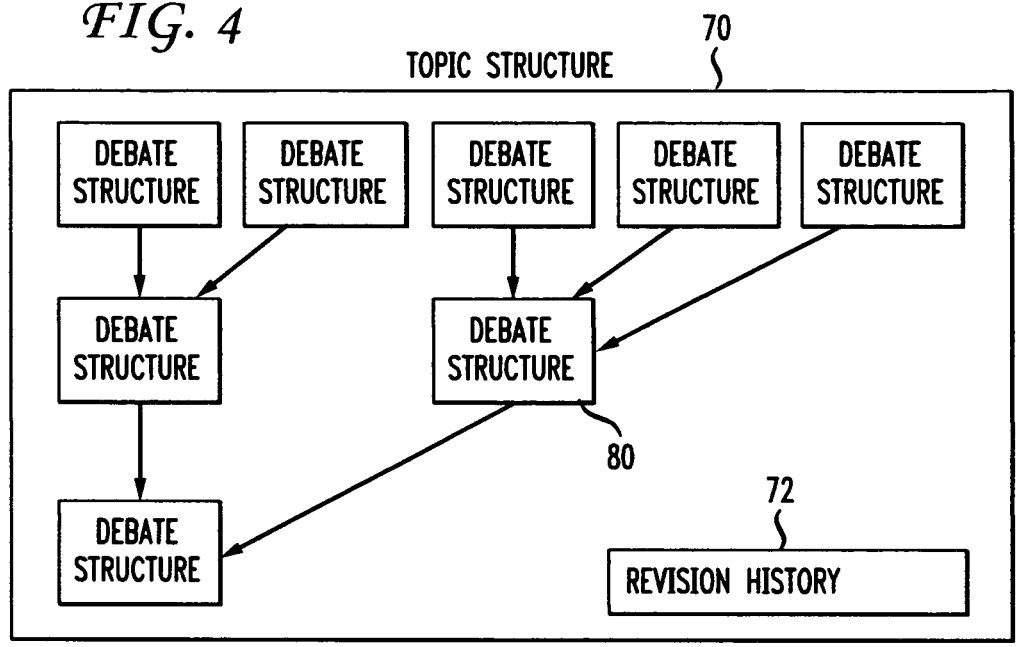
FIG. 4 is a block diagram of a topic structure in accordance with one embodiment of the present invention.

FIG. 4 is a block diagram of a topic structure 70 in accordance with one embodiment of the present invention. A subcomponent of topic structure 70 is a debate structure 80. Also shown as part of topic structure 70 is a revision history 72 for topic structure 70. In a preferred embodiment, topic structure 70 is comprised of one or more debate structures.

Figure 5:
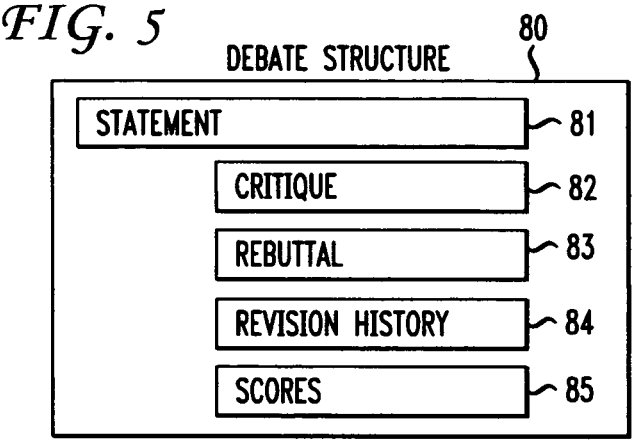
FIG. 5 is a block diagram of a debate structure in accordance with one embodiment of the present invention.

FIG. 5 is a block diagram of a debate structure in accordance with one embodiment of the present invention. Debate structure 80 is a single statement 81 or concept (which may require more than a single statement to be expressed), i.e., either an ASSUMPTION or CONCLUSION, and all of the data that may be associated with statement 81, such as critiques 82, rebuttals 83, a debate structure revision history 84, and scores 85. Initially, when debate structure 80 is created, the only element of debate structure 80 that the topic author can change directly is statement 81. A topic author may add rebuttals 83 at a later point thereby revising debate structure 80. Otherwise a topic author cannot make a permanent change to debate structure 80 or to any other data she has posted for other users to see.

All users except the topic author can critique a statement 81 of any debate structure 80. A critique is added by the application software using critique addition module 41. Once a user has added a critique, the topic author may respond with a corresponding rebuttal 83. Rebuttal 83 is added by the application software using rebuttal addition module 42. In a preferred embodiment only the topic author can rebut a critique 82 to one of the author's statements in a given debate structure 71.

The author of a critique 82 can revise the critique 82. This is implemented by critique revision module 41. Similarly, the topic author can revise her rebuttal 83, implemented by rebuttal revision module 42. Previous revisions of critiques 82 and rebuttals 83 can be viewed in revision history 84 of each debate structure 71.

In a preferred embodiment, revision history 84 shows relationships of critiques 82 and rebuttals 83, for example, which revised rebuttal was made in response to which critique. When a previous critique 82 is selected for display, a corresponding rebuttal 83 is also shown (and vice versa), thus providing context for the critique and rebuttal.

As mentioned, a topic author can revise a statement of a debate structure 71 that is in a topic structure 70 created by the author and republish using the topic revision module 40.

Returning to topic structure 70, once it has been created, the topic author can publish topic structure 70 using topic addition module 40. Topic structure 70 can be composed of any number of debate structures. Debate structures are added to topic structure 70 using topic revision module 40. Topic structure 70 is manifested to the public by two visual components of topic structure 70: topic layout 91 shown in FIG. 3 and a statement map 90 shown in FIG. 6, described below.

Figure 6:
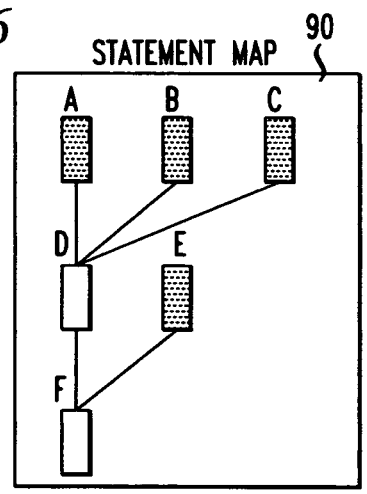
FIG. 6 is a block diagram of a statement map in accordance with one embodiment of the present invention.

FIG. 6 is a block diagram of a statement map in accordance with one embodiment of the present invention. In a preferred embodiment, a user wanting to know the topic of debate will see, specifically, a statement map 90 and a topic layout 91. Map 90 and layout 91 are displayed via display module 60. Statement map 90 is generated by statement map creation module 44 which examines topic structure 70 in order to create map 90. Topic layout 91 is also generated by examining topic structure 70.

Once a topic structure 70 is published, statement map 90 and topic layout 91 are viewable to any user. Statement map 90 has boxes labeled A through F which correspond to ASSUMPTIONS and CONCLUSIONS in FIG. 3. Characters are used in the illustration shown in FIG. 3 to prevent confusion. Numerals or other identifiers can be used to label the boxes. In a preferred embodiment, boxes that are shaded are ASSUMPTIONS and un-shaded boxes represent CONCLUSIONS. In other embodiments, ASSUMPTIONS and CONCLUSIONS are visually distinguishable in some other manner. The lines between the boxes represent that the statement above supports the statement below. This creates a top-down hierarchical map showing the logical support structure of a debate. The statement map feature allows users to easily visualize the structure of a debate: Are there many assumptions being made? Are conclusions being made based on assumptions or other conclusions? Is this an extensive, far-reaching argument or a concise one? and so on.

In a preferred embodiment, an ASSUMPTION 81 that remains unchanged after a topic structure revision carries forward its entire corresponding debate structure 71 including any related critiques 82 and rebuttals 83 given that ASSUMPTIONS have no dependencies. However, for the same 'carry forward' feature to apply for a CONCLUSION, there cannot be changes to any of the CONCLUSION's supporting debate structures. A topic author and other users are informed when an entire corresponding debate structure does not carry over. They are also informed when an ASSUMPTION has been changed.

In a preferred embodiment, the default viewing option is one where a user views a topic structure 70 wherein certain or, if desired, all critiques 82 and rebuttals 83, are hidden. This option gives the user an uncluttered view of the original argument. A user also has the option of viewing any topic structure 70, presented as topic layout 91 where each statement 81 within debate structure is displayed only with the most recent associated critiques 82, rebuttals 83 and partial revision history 84.

In another preferred embodiment, a topic author has the option of limiting which users can view or participate in an adversarial discussion. These users are identified in a "whitelist" of user and domain names. This allows entities such as a governmental organizations or universities, to limit discussion participants as desired.

In another embodiment, a topic author has the option of allowing specific users to share with the topic author the responsibility of revising a topic structure's statements and rebuttals. In addition, the topic author may allow users the option of co-writing critiques. Thus, a critique may have two or more authors. The topic author can also allow one or more users to score the statements, critiques and rebuttals in a debate structure. These users can be specified in a whitelist of user and domain names. Such group topic revision, group critiquing, and group scoring facilitate debates among teams and can be a useful feature in classrooms, groups, organizations, and so on. For example, teams can be created and named, Defenders, Critics, and Evaluators. Defenders are those who can create/revise statements and create/revise rebuttals, Critics can create/revise critiques, and Evaluators can score. The topic author does not necessarily need to belong to any of these groups which allows a moderator or instructor to create a topic, create teams and let them debate. Following the same example, in a preferred embodiment, the Defenders, by default, are the topic owners and the Critics and Evaluators are open to all users. The presence of a specific group of Critics also allows the online debate application to inform those users when the topic is published and ready for their review.

In another preferred embodiment a user can post a critique to a statement only if that user has viewed at least one previous critique of that statement 81. This requirement helps reduce unnecessary duplication of critiques. In another preferred embodiment all critiques are displayed when a user wishes to add a critique and is not required to read any critiques.

In a preferred embodiment, a user can add a topic structure 70 to a watchlist. This allows the user to return to that topic structure easily from any location in the online debate application software of the present invention. In another preferred embodiment, a user can tag an option to a topic structure that the user has placed on the watchlist. For example, one option may be to have the debate application software notify the user when the topic structure has been updated regardless of whether the user is participating in a debate on the topic.

In a preferred embodiment, a user can evaluate any statement 81, critique 82, or rebuttal 83 that the user did not create. This evaluation can be manifested by assigning a score to statement 81. For example, critiques and rebuttals are scored by explicitly agreeing with a particular critique or rebuttal, disagreeing with the critique or rebuttal, or disagreeing with accompanying rationale. For example, a rationale or reason can be one of the following: generalization, "from authority," red herring, "straw man," "begs the question," false analogy or personal attack. Several other rationales and reasons can also be available to the user or the user can create rationales ad hoc.

Thus, a user can score a statement by explicitly agreeing with the statement. Similarly, a user can score a statement by disagreeing with the statement, for example, by posting a new critique or agreeing with an existing critique. If a user agrees with a critique of a statement, the user has by implication disagreed with the statement and with the topic structure. However, a user cannot post a disagreement with the entire topic structure unless the user has agreed with or written a critique of a topic statement.

In a preferred embodiment, topics—manifested by topic structures—can be ranked. Ranking, also referred to as scoring, allows a user to quickly determine which statements in a topic structure, as opposed to critiques and rebuttals, have the highest number of disagreements or negatives. This can be shown in statement map 90 or topic layout 91 and allows users to focus on the more contentious points in a debate. A user can make a single critique which can devastate an argument and remain visible to all users regardless of how often the topic author revises her rebuttal in response to the single critique.

Ranking also assists new users in identifying topics that may be of interest to them. For instance, a user may want to participate or examine a topic that has many users (both in terms of percentages and numbers) agreeing with the point of the topic, which can be gleaned from a quick review of the topic's rank. A topic is ranked based on scores given to various components of its debate structures, namely, statements, critiques, and rebuttals. In a preferred embodiment, a topic is ranked based primarily on users agreement or disagreement with the topic. Logically, disagreement with a topic is caused by agreeing with critiques but the score of a rebuttal has no impact on an overall topic rank.

Users can disagree with critiques and rebuttals with options such as those mentioned earlier: generalization, "from authority," red herring, "straw man," "begs the question," false analogy, personal attack, and others. The online debate application can create visual representations, such as graphs, that display these options for each critique and rebuttal. This allows users to clearly see the frequency of the various forms of disagreement others had with a particular critique or rebuttal. Critique ranking can also be used to order the presentation of critiques after a topic statement. For example, the critique with the highest number in agreement would appear first insuring that the most valid criticism of a topic statement as judged by those scoring is the first critique that a user would see following the topic statement.

While a topic author can revise the topic at any time, i.e., revise any statement within the topic structure, for example, add or delete topic statements, another user may make her own copy of the topic structure and revise it as she sees fit. She then owns the copy of the topic structure and can make new statements which other users can critique. In a preferred embodiment a copy of the topic structure includes a pointer back to die original topic structure so that users can see the origin of the material.

In a preferred embodiment, a user has the option of allowing another user to e-mail a formatted and 'cleaned up' URL and message regarding a topic structure to other users or individuals not using the application. A topic author or any other user can also create a hyperlink for any statement, critique or rebuttal, and send the link to other users. This enables a user to point other users directly to a specific response to a statement regardless of where the response resides; for example, whether it is in a history or whether it is the most recent response made in a debate structure. In another preferred embodiment, a particular user can conceal or collapse critiques by other users which the particular user believes clutters the debate, are unconstructive, or are simply chronically useless to the debate. These hidden critiques can still be viewed by other users.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program module means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

I claim:

1. A computer-implemented method of a forum for an adversarial discussion, the method comprising:
   accepting a first statement from a topic author, wherein the first statement is labeled as an assumption statement on a first computer,
   creating a topic layout based on file first statement on the first computer, the topic layout representing the basis for an adversarial discussion;
   allowing the topic author to add one or more secondary statements on the first computer, wherein a secondary statement can support the first statement, and if the first statement is an assumption statement, then relabeling the first statement from an assumption statement to a conclusion statement;
   enabling a plurality of users using a plurality of computer users to independently critique the first statement or the one or more secondary statements and enabling the topic author to rebut said critiques wherein revisioning is required upon a limited structure thereby preventing digression wherein every critique is made against only a single said statement of the original topic;
   allowing the topic author to create said topic layout on the first computer wherein the topic layout displays in a visual tree structure the explicit relationships among the one or more secondary statements and the first statement, thereby enabling adversarial online discussions without a moderator and facilitating the plurality of users and the topic author to succinctly define th0ir own positions, and wherein the first computer and the plurality of computers communicate over a network; and
   displaying one or more statements of disagreement by the plurality of users and excluding from view a plurality of extraneous earlier revisions of statements by the plurality of users made in identifying the one or more statements of disagreement, thereby allowing said plurality of computer users to make a contribution to the discussion that can not be hidden by repetitive rebuttals, therefore decreasing a noise-to-content ratio while automatically restricting the display depth of all content to a maximum of 3 levels, topic statement, critique and rebuttal and since said statements of disagreement are made on the fixed said topic each user can fully contribute to the discussion without having their contribution hidden as happens in time based messaging systems.

2. A method as recited in claim 1 further comprising:
   displaying one or more assumption statements in an explicit manner, thereby facilitating an evaluation of the one or more assumptions by the plurality of users prior to a specific user entering the adversarial discussion.

3. A method as recited in claim 2 further comprising displaying one or more conclusion statements in an explicit manner.

4. A method as recited in claim 1 further comprising:
   enabling a second user to assign a score to a statement by a first user by either agreeing with the statement or disagreeing with the statement, thereby assisting the plurality of users in evaluating the statement in the adversarial discussion.

5. A method as recited in claim 1 further comprising:
   displaying a graphical depiction of one or more scores from the plurality of users for the first statement and for the one or more secondary statements, thereby enabling the plurality of users and the topic author to determine where argumentative weaknesses may exist at said statement level within the said author's topic.

6. A method as recited in claim 1 further comprising examining the topic structure thereby generating a topic layout.

7. A method as recited in claim 1 wherein enabling a plurality of users to react to the first statement or to the one or more secondary statements further comprises enabling a specific group of users of the plurality of users to collectively react to the first statement or to the one or more secondary statements such that the specific group of users can provide a group reaction to a statement.

8. A method as recited in claim 7 further comprising allowing a single user to oversee the adversarial discussion wherein the adversarial discussion has one or more specific group of users.

9. A method as recited in claim 1 further comprising:
   publishing the topic structure thereby allowing the plurality of users to see the topic structure thereby establishing the context in which all said critiques and rebuttals are placed regardless of when they were added thereby preventing the topic author from repetitively grandstanding said topic contents as the context remains constant and does not drift away.

10. A method as recited in claim 1 wherein a topic structure is comprised of one or more debate structures.

11. A method as recited in claim 10 wherein a debate structure is comprised of a single statement and all associated data, including a debate structure revision history.

12. A method as recited in claim 1 further comprising:
   requiring revisioning of a critique and a rebuttal such that only a final draft of each is displayed by default where said critique is attached to said statement and each rebuttal is attached to said critique, thereby eliminating unnecessary back and forth postings from the discussion which stops repetitive grandstanding of said critiques and rebuttals as well as naturally hiding the early drafts of said critiques and said rebuttals, wherein users can only overwrite their own contributions which also maintains the proximity of the said critique/rebuttal final drafts to the said statement which promotes easy content navigation unlike time based messaging systems and all without a moderator;
   and displaying a revision history thereby allowing said users to see how the said critique/rebuttal discussion evolved only if they wish to be so exposed to such noise.

13. A method as recited in claim 12 further comprising displaying relationships among a plurality of critiques and a plurality of rebuttals.

14. A method as recited claim 1 further comprising examining the topic structure thereby generating the topic layout.

15. A method as recited in claim 1 further comprising:
   enabling the topic author to limit which users of the plurality of users participate in the adversarial discussion.

* * * * *